United States Patent [19]

Okura

[11] Patent Number: 5,050,273
[45] Date of Patent: Sep. 24, 1991

[54] SUSPENDING WIRE OF CABLE CLAMP FOR TELEPHONE LINE

[76] Inventor: Masahiko Okura, 11-7, 4-chome, Shiroganedai, Minatoku, Tokyo, Japan

[21] Appl. No.: 550,039

[22] Filed: Jul. 9, 1990

[51] Int. Cl.⁵ ............................................. F16L 3/00
[52] U.S. Cl. ................................... 24/136 R; 248/58
[58] Field of Search ............... 248/690, 692, 58, 61, 248/62, 63, 74.4, 215, 231.6, 302, 303, 317, 339, 340; 24/598.6, 598.5, 136 R, 115 M

[56] References Cited

U.S. PATENT DOCUMENTS

| | | | |
|---|---|---|---|
| 106,043 | 8/1870 | Fletcher | 24/598.6 |
| 1,686,424 | 10/1928 | Thomson | 24/136 R |
| 2,068,368 | 1/1937 | Bouvier | 24/136 R |
| 2,131,171 | 9/1938 | Fotsch | 24/136 R |
| 3,079,657 | 3/1963 | Russell | 24/598.6 |
| 4,738,124 | 4/1988 | Conner | 248/303 |
| 4,934,634 | 6/1990 | Breeden, Jr. | 248/62 |

FOREIGN PATENT DOCUMENTS 373384  5/1932  United Kingdom ................. 248/61

*Primary Examiner*—Ramon O. Ramirez
*Assistant Examiner*—Robert A. Olson
*Attorney, Agent, or Firm*—Moonray Kojima

[57] ABSTRACT

Disclosed herein is a suspending wire for cable clamps having a quite simple and easily operable construction and providing with a rear end portion fixed onto the cable clamp and a fore end portion forked into two of the same length to be twisted once each other to assume a constant twisted form due to their own elasticity in order to define a ring-like portion at the fore end portion, said constant twisted form being rendered enable to be untwisted easily by the ordinary worker's finger end operation.

1 Claim, 1 Drawing Sheet

SUSPENDING WIRE OF CABLE CLAMP FOR TELEPHONE LINE

BACKGROUND OF THE INVENTION

The cable clamps for the telephone wire are ordinarily suspended onto a hook member set on a desired spot. In such cases, the suspending wire member on the clamp may have a ring portion at their fore end portion, while the suspending wire member for a ring member set on a desired spot should be made into hook or so like member. The suspending wire member of this invention belongs to the latter.

The various suspending wire members belonging to the latter have heretofore been disclosed frequently. The well known ones, however, have such defects that those will come to, even in some degree, high cost to manufacture and further those will requisite worker's not a little cares in their high place work owing to the comparatively troublesome operation in the suspending on and off works.

SUMMARY OF THE INVENTION

The suspending wire of this invention has been directed to yield a large advantage when used for cable clamps, which has been realized from a novel and quite simple conception.

The main point of the invention consists in that the suspending wire is forked into two of the same length at the fore end thereof to be twisted once each other making use of their own elasticity for assuming a rigid (or constant) twisted form capable of easy turning to untwisted and retwisted form and for defining a ring-like portion at the fore end portion of the wire.

It will be quite important matter in this event that, when a suitable material and a size of the diameter are selected for the wire, the worker could be able easily to untwist the twisted form and to retwist again by his finger end operation without any uneasiness even in the high place work and yet which results in getting a high suspending effect of the wire.

DESCRIPTION OF THE PREFERRED EMBODIMENT

Figure 1:
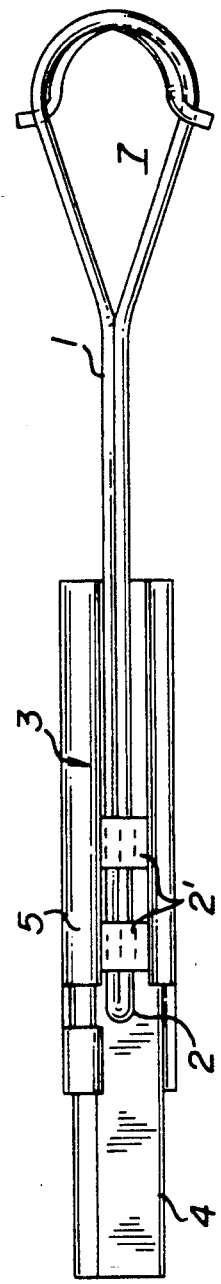
FIG. 1 is a plan view of a preferred embodiment of the invention.
Figure 2:
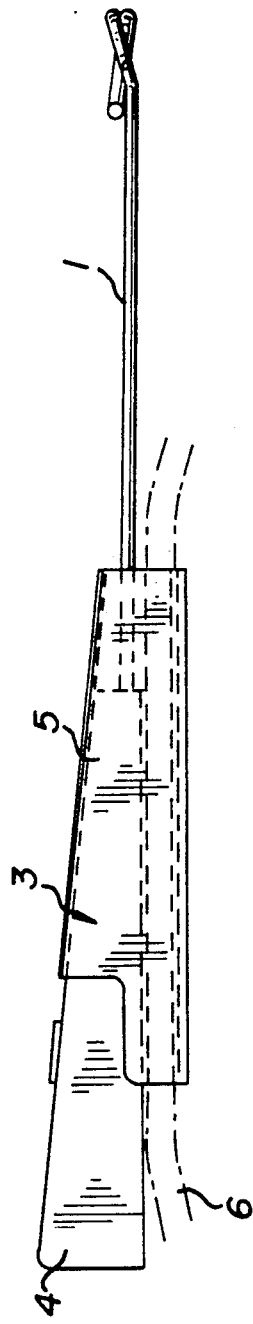
FIG. 2 is an elevation of the same.

In the Figures, 1 is a suspending wire member relating to the invention, the rear end portion 2 thereof being fixed onto the wedge-like member 4 of a cable clamp 3 by two holding pieces 2'. The cable clamp 3 comprises said member 4 and a sleeve member 5 into which the member 4 is fitted to clamp a cable 6. The fore end portion of the wire member is forked into two of the same length to be twisted once each other as shown in the Figures to assume a constant (or rigid) twisted form, and thereby a ring-like portion 7 is defined at the fore end of the wire member. As stated above, it is apparent that the constant form of the twisted portion could, under assurance of high suspending effect, be easily untwisted and retwisted due to suitable selection of the material and the thick of the wire.

In operation, the twisted form of the wire member will be untwisted in the first place by the finger top operation of the worker to pass through the suspending ring member mounted on a desired point, then it may be retwisted again to provide the ring-like portion to the fore end of the suspending wire.

According to the present invention, since the solid suspending work can be accomplished through the quite easy operation and simple construction, it possesses the advantage that the suspending work can be carried out without any uneasiness even in the high place work, and yet it may be made at the almost same low cost as the wire member having ring form at the fore end portion thereof.

I claim:

1. A clamp for a telephone cable, comprising
a body member having a channel;
a wedge member fitted into the channel of said body member for holding the telephone cable therebetween; and
a suspending wire connected to said clamp for attachment to a holding means; wherein
said suspending wire is a single strand wire looped over itself at substantially the center thereof to form a closed end portion at the looped over center, an intermediate portion comprising two segments of the single strand wire and attached to each other, and an open end portion wherein the two ends of the single strand wire are separated from each other, said closed end portion being fixed to the clamp, and the two open end portions of the single strand wire being each bendable at least once over each other to form therebetween an opening for attaching to said holding means.

* * * * *